United States Patent
Day et al.

(10) Patent No.: US 7,093,080 B2
(45) Date of Patent: Aug. 15, 2006

(54) METHOD AND APPARATUS FOR COHERENT MEMORY STRUCTURE OF HETEROGENEOUS PROCESSOR SYSTEMS

(75) Inventors: Michael Norman Day, Round Rock, TX (US); Harm Peter Hofstee, Austin, TX (US); Charles Ray Johns, Austin, TX (US); James Allan Kahle, Austin, TX (US); David J. Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/682,386

(22) Filed: Oct. 9, 2003

(65) Prior Publication Data

US 2005/0080998 A1    Apr. 14, 2005

(51) Int. Cl.
*G06F 12/00*    (2006.01)

(52) U.S. Cl. .................. 711/141; 711/145; 711/202
(58) Field of Classification Search ........ 711/141–145, 711/202; 710/107; 717/100; 719/315
See application file for complete search history.

(56) References Cited

U.S. PATENT DOCUMENTS

| 5,764,932 | A | * | 6/1998 | Gochman et al. | ........... 710/107 |
| 5,978,578 | A | * | 11/1999 | Azarya et al. | ............... 717/100 |
| 6,298,390 | B1 | * | 10/2001 | Matena et al. | ............... 719/315 |
| 6,334,172 | B1 | | 12/2001 | Arimilli et al. | |
| 6,587,931 | B1 | * | 7/2003 | Bauman et al. | ............. 711/145 |
| 2002/0074668 | A1 | | 6/2002 | Hofstee et al. | |
| 2002/0078270 | A1 | | 6/2002 | Hofstee et al. | |
| 2002/0078285 | A1 | | 6/2002 | Hofstee et al. | |
| 2002/0078308 | A1 | | 6/2002 | Altman et al. | |
| 2002/0138707 | A1 | | 9/2002 | Suzuoki et al. | |
| 2002/0156993 | A1 | | 10/2002 | Suzuoki et al. | |
| 2004/0111563 | A1 | * | 6/2004 | Edirisooriya et al. | ....... 711/141 |

* cited by examiner

*Primary Examiner*—Nasser Moazzami
(74) *Attorney, Agent, or Firm*—Stephen J. Walder, Jr.; Diana R. Gerhardt

(57) ABSTRACT

Disclosed is a coherent cache system that operates in conjunction with non-homogeneous processing units. A set of processing units of a first configuration has conventional cache and directly accesses common or shared system physical and virtual address memory through the use of a conventional MMU (Memory Management Unit). Additional processors of a different configuration and/or other devices that need to access system memory are configured to store accessed data in compatible caches. Each of the caches is compatible with a given protocol coherent memory management bus interspersed between the caches and the system memory.

20 Claims, 2 Drawing Sheets

METHOD AND APPARATUS FOR COHERENT MEMORY STRUCTURE OF HETEROGENEOUS PROCESSOR SYSTEMS

TECHNICAL FIELD

The invention relates to a coherent multiprocessor (MP) bus for communication between caches used by non-homogeneous processors.

BACKGROUND

One method of extending or adding to the processing capability of a processing unit is to offload some of the work or functions to one or more coprocessors. Typically one processor is a main or control plane processor which is used to coordinate the work of the remaining data plane processors. Each of these processors will typically have their own cache memory. Data plane processors will also typically have their own Local Memory. As is known, caches are essentially temporary storage memory directly or closely linked to a processor. The amount of time required to retrieve information from a cache is significantly less than the time required to retrieve information from hard disk or even from RAM (Random Access Memory. For this reason, a given processor, in a multiprocessor system, typically, when needing information not in its associated cache, will perform a request for the information from memory. Other processors in the multiprocessor system will first perform a lookup or "snoop" request to ascertain if the information being requested is contained in the cache associated with that "another processor." If so, the information may be directly retrieved from the other cache and each cache in the system is advised if state changes are required in the cache for that memory location, as set forth infra. Thus caches, even of other processors, are used to reduce latency or the time that it takes to retrieve information, especially where that information is likely to be used multiple times by a given processor.

To prevent destruction of data being used or accessed simultaneously by different processors and to further assure that data accessed is the most recently correct value, coherent memory systems have been developed and used to communicate the status of data to all processors using data contained in a given virtual or physical memory location. One example of a coherent memory management system uses a protocol referred to in the industry as a MESI protocol. Each read or write request involves all other caches in the system. After each read or write request relative a given memory location, each cache in the system maintains a record of the cache state with respect to that memory location of Invalid, Shared, Exclusive or Modified in accordance with the MESI protocol. More information on such coherency protocols may be obtained from many sources such as the Internet and so forth. An extended MESI protocol outlined in this invention is set forth in a U.S. Pat. No. 6,334,172 issued Dec. 25, 2001 and assigned to IBM. Known prior coherent memory systems were, however, limited to processors executing the same instruction set, having the same cache hierarchy, and each accessing or addressing memory in the same manner.

A prior art multiprocessing system having heterogeneous processors is shown in an application Ser. No. 09/736,585 filed Dec. 14, 2000, entitled Symmetric Multi-Processing System and assigned to the same assignee as the present invention. This system is also shown in Publication 2002/0078308 published Jun. 20, 2002. In this system, the main processing units (PUs) can access memory at either a physical or a virtual memory location using Load and Store instructions. However, the auxiliary (APU) or synergistic (SPU) processor units access memory using a DMA (Direct Memory Access) unit and have a different cache hierarchy than the PUs. Elsewhere, in IBM prior art, memory management schemes have been described for the DMA units to access memory using a physical and/or a virtual address. In addition, the SPUs have a Local Storage which may be addressed as part of system memory. In other words, the PUs and the APUs were heterogeneous or non-homogeneous.

It may be pointed out that in such heterogeneous processor systems, the APUs are typically specialized processors for doing specific jobs more efficiently, and with less hardware than is used in conjunction with the central or control processors.

Typically, homogeneous multiprocessor systems provide instructions for performing atomic updates of a memory location. Atomic updates are useful in cooperative programming environments to perform operations such as "compare and swap," "test and set," "fetch and no-op," and "fetch and store". These instructions typically rely on a coherent access of a system memory location. A means for a DMA unit to issue atomic update of memory has been described in IBM prior art. When combined with the present invention, the SPU can perform the above operations in a compatible manner as the control processor(s) and thus participate in a cooperative programming environment with the control processor.

Further in the IBM prior art, methods are described for allowing a DMA operation to be cached and also for data to be predictably pre-fetched. As is known, caches and pre-fetching data typically are provided in a multiprocessor system to improve the performance of a cooperative programming environment. However, to take advantage of these methods in a shared memory system with the control processor, the cached and pre-fetched data must be coherent with the other system caches.

While the characteristics of a prior art non-homogeneous processor can be implemented without a coherent memory structure, the performance and difficulty in programming in such an environment suffers greatly. It would thus be highly desirable to have a system whereby each processor, regardless of processor configuration, can time efficiently and in a coherent manner communicate with other caches used by other processors in the system to minimize time required to retrieve valid and up-to-date information utilized by more than one processor of a multiprocessor system.

SUMMARY OF THE INVENTION

The present invention sets forth a method of communication between processors and their associated caches as used by non-homogeneous processors to provide a coherent memory system.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
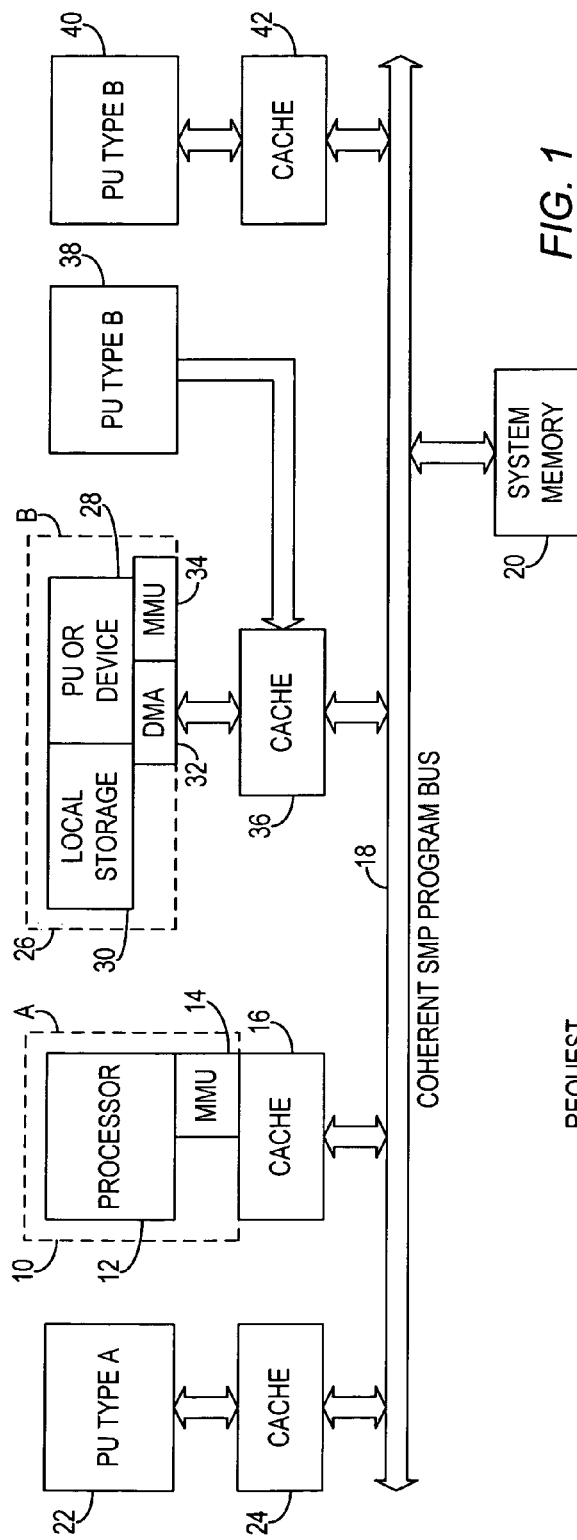
FIG. 1 is a block diagram of a non-homogeneous multiprocessor system.

In FIG. 1, a dash line block 10 includes a first or type A processor unit or PU 12 and an MMU (Memory Management Unit) 14. For the purposes of this discussion, PU 12 may be considered as a general purpose processor operating in a control or central processing unit (CPU) mode. While the PU may comprise many components besides the MMU, such components are not specifically shown to simplify this explanation of operation of the invention. The MMU 14 operates in conjunction with a cache 16 to communicate via a bus 18 with other devices and processors as well as with a system memory block 20. As known in the art, an MMU operates to translate processor instructions and data effective addresses to physical memory addresses. The block 20 may include not only ROM (Read Only Memory) and RAM (Random Access Memory), but also Memory Mapped devices such as a hard disk for maintaining the virtual memory. The bus 18 is further labeled as a coherent SMP (Symmetric MultiProcessor) processor bus. Another type A processor 22 is shown communicating via a cache 24 with the bus 18. A different configuration device or processor is shown within a dash line block 26. Within block 26 is shown a processor or other device block 28 communicating with a local store 30 and further utilizing an MMU 34 and a DMA block 32 to communicate with other entities via an optional cache 36 and bus 18. For the purposes of this discussion, block 28 will typically be a processor of a different configuration than the type A processor 10. In a preferred embodiment, it will be a special purpose processor which is programmable, however, more suited to a class of applications than the type A general purpose processor. An example of a processor might be a DSP (Digital Signal Processor). Such a processor primarily will typically operate on data inserted into the local storage block 30 by a control processor. Local storage block 30 is mapped into the physical address space of the system and may be directly accessed in the same manner as system memory block 20 by a control processor or indirectly by the DMA controller block 32. On occasion, processor 28 may need to transfer additional information between local storage 30 and system memory 20 using the DMA controller 32. Even though described as a programmable processor, block 28 may however be a single function device such as a graphics controller or one providing MPEG (Moving Picture Experts Group) compression. Another type B block 38 is shown communicating with bus 18 via the same cache 36 as is used by block 26. A third block 40 is shown labeled as being a type B PU. However the invention is capable of supporting a multiplicity of processors, device configurations, and cache hierarchies that need access to a common system memory. As shown, block 40 communicates with bus 18 via a cache 42, although it could use any other cache capable of communicating with a plurality of devices such as the cache 36. The bus 18 is shown with arrows on each end to illustrate that the bus may be connected to other devices external to or a part of the multiprocessor system.

As is known, the MMUs 14 and 34 use a table stored in system memory for the translation of a virtual address to a real address. In a cooperative programming environment, the MMUs 14 and 34 share a common translation table. When a program requires more memory than available real memory, the operating system moves a region of real memory to a hard disk or other non-directly addressable storage media to make room for the data required by the program at that moment in time. This process is known as "paging." As memory is paged in and out of real memory, the operating system must update the translation table to reflect the new virtual to real mappings. Without coherency, updates of the translation table may not get reflected in the MMUs and future translations may be incorrect. The coherent memory structure put forth in this invention insures that all future translations are correct.

In a cooperative programming environment, the atomic update of system memory is required for synchronization of programs executing on the control and data plane processors. The atomic update of memory typically is a read-modify-write operation which relies on a coherent memory structure for proper operation. First, an atomic load is performed to read the current data for the memory location. When the load is performed, a reservation is also set for the corresponding memory location. Next, the data is operated on by a program and written back to the same memory location using an atomic store. If another processor or device accesses the data between the atomic load and the atomic store, the reservation is lost and the atomic store will fail. If the atomic store fails, the program performs the atomic read-modify-write operation again.

Figure 2:
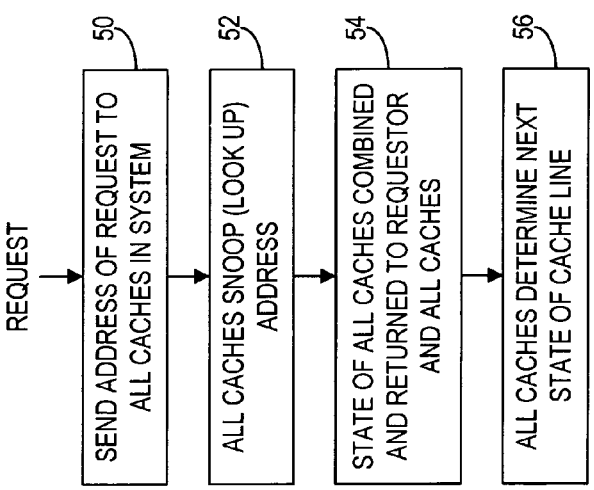
FIG. 2 is a flow diagram of the process used in updating cache tables to provide coherency of data.

The flow diagram of FIG. 2 commences with a request from a processor, or other device, for data contained at a given address in system memory 20. A first step 50 is for the request to be sent to all the other caches in the system that are connected to bus 18. Each of these caches, as set forth in a step 52, look up the address in a table located in each of the caches. The state of all of these caches, as set forth in the protocol of the coherent system being used, are combined and returned to the requestor as well as to all the remaining caches, as set forth in step 54. The table internal to each of the caches is then updated to the next state of the cache line indicated by the address involved in the request.

Figure 3:
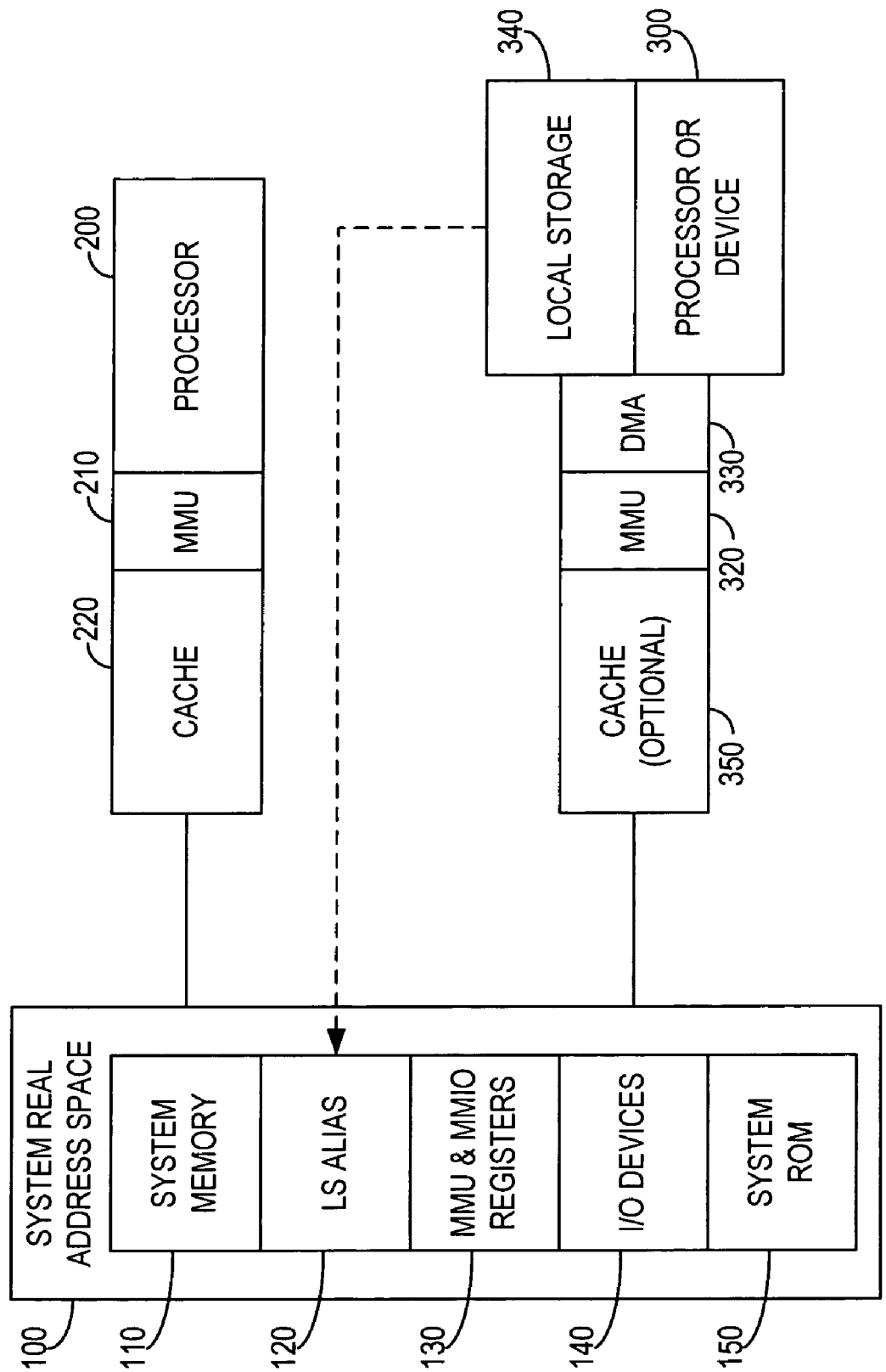
FIG. 3 is an illustration of the System Memory Map associated with the multiprocessor system of FIG. 1.

FIG. 3 illustrates a typical memory map for the non-homogeneous multiprocessor system depicted in FIG. 1. A Real Address Space 100 represents the mapping of various system resources into the address space of a control processor 200 and a data plane processor 300. The block 100 further includes a system memory block 110, an LS (Local Storage) Alias block 120, an MMU & MMIO registers block 130, an I/O devices block 140 and a system ROM block 150. The processor 200 further includes an MMU block 210 and a cache 220. The specialized or heterogeneous processor 300 is shown having an MMU block 320, a DMA block 330, a local storage block 340 and an optional cache block 350. System memory 110 represents the DRAM and SRAM storage of the system. MMU and MMIO registers block 130 represents the mapping of the Memory Management translation tables, the control registers for the DMA controller 330 and Memory Management Unit (MMU) 320, as well as other system control registers. I/O Devices area 140 represents the mapping of I/O devices, such as a Hard Disk controller, and the System ROM area 150 represents the mapping of non-volatile memory. Local Storage Alias 120 represents the mapping of the Local Storage blocks 340 into the real address space of the system. The Local Storage Alias allows other processors within the non-homogeneous multiprocessor to directly access data stored in memory of a data plane processor such as 340.

Mapping the Local Storage of a data plane processor into the real address space of the system allows a control processor, another data plane processor, or other system device to directly access data in Local Storage. Since the Local Storage looks like system memory, these accesses may be cached and thus require a coherency mechanism to prevent the destruction of the data.

As will be realized by the above, the present invention comprises providing access to system memory in a coherent memory managed manner to heterogeneous processors and other devices. One coherent memory space is provided for a plurality of heterogeneous processors. The coherent access to system memory and single memory space allows the efficiencies of the cache structures to be realized for transfers of data between the local storage and system memory. In other words, the more efficient prior art system of communication of cache to cache transfers of modified or shared data and the direct transfer of data between the system caches and the local storage, such as optional cache 36, 42 or 350, is not utilized or is bypassed in the present invention.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A non-homogeneous multiprocessor system, comprising:
    a first processor coupled to a first local store;
    a first cache associated with said first processor;
    one of a second processor or other device non-homogeneous with said first processor;
    multiprocessor bus means connected to said first cache of said first processor and to said one of a second processor or other device non-homogeneous with said first processor for providing cache coherent communications via said bus means; and
    a system memory having a coherent memory space, the system memory being shared by the first processor and the one of a second processor or other device non-homogeneous with said first processor, wherein the coherent memory space in system memory includes a local store alias portion that maps a local store address space into a real address space of the system memory, and wherein the one of a second processor or other device non-homogeneous with said first processor accesses the first local store of the first processor using the local store alias portion of the coherent memory space in the system memory.

2. The apparatus of claim 1 comprising, in addition, a second cache associated with said one of a second processor or other device non-homogeneous with said first processor and connected to said bus means.

3. The system of claim 1, wherein the one of a second processor or other device non-homogeneous with the first processor is a second processor, and wherein the second processor is one of a control processor or a data plane processor.

4. The system of claim 3, wherein the first processor accesses a portion of data in a second local store associated with the second processor using the local store alias portion of the coherent memory space in the system memory, and wherein the portion of data accessed in the second local store is cached in the first cache.

5. The system of claim 2, wherein the second processor or other device non-homogeneous with the first processor accesses a portion of data in the first local store using the local store alias portion of the coherent memory space in the system memory and stores the portion of data in the second cache.

6. The system of claim 1, wherein data transfers between the first local store and the system memory are performed using the local store alias portion of the coherent memory space in the system memory.

7. A cache coherent multiprocessor system, comprising:
    a shared memory;
    a first cache;
    a first processor, coupled to the first cache and the shared memory, having a first local store, wherein the first processor normally communicates directly with said shared memory and stores retrieved data in said first cache;
    a second processor, of a configuration different from said first processor, said second processor not typically communicating directly with said shared memory; and
    a cache coherent system communicating with both said first and second processors, wherein the shared memory has a coherent memory space that includes a local store alias portion that maps a local store address space into a real address space of the shared memory, and wherein the second processor accesses the first local store of the first processor using the local store alias portion of the coherent memory space in the shared memory.

8. The apparatus of claim 7 comprising, in addition:
    a second cache, associated with said second processor, in which data normally first obtained from shared memory is stored.

9. A method of sharing the use of system memory data by heterogeneous devices in a multiprocessor system, comprising:
    sending a request for a copy of system memory stored data to coherent memory configured caches of other devices, including caches of heterogeneous devices, before attempting retrieval directly from system memory;
    storing data, retrieved from a cache of a heterogeneous device in a cache associated with the requesting device; and
    updating a state table associated with each coherent memory configured cache to reflect the appropriate state after the data is stored in the cache of the requesting devices, wherein the system memory is shared by the heterogeneous devices and has a coherent memory space that includes a local store alias portion that maps a local store address space of at least one local store associated with at least one of the heterogeneous devices into a real address space of the system memory, and wherein a first heterogeneous device accesses a local store of a second heterogeneous device using the local store alias portion of the coherent memory space in the system memory.

10. The method of claim 9, wherein the first heterogeneous device is one of a control processor or a data plane processor.

11. The method of claim 9, wherein the second heterogeneous device accesses a portion of data in a second local store associated with the first heterogeneous device using the local store alias portion of the coherent memory space in the system memory, and wherein the portion of data accessed in the second local store is cached in a first cache associated with the second heterogeneous device.

12. The method of claim 9, wherein the first heterogeneous device accesses a portion of data in the first local store using the local store alias portion of the coherent memory space in the system memory and stores the portion of data in a second cache associated with the first heterogeneous device.

13. The method of claim 9, wherein data transfers between the first local store and the shared memory are performed using the local store alias portion of the coherent memory space in the system memory.

14. A computer program product for sharing the use of system memory data by heterogeneous devices in a multi-processor system, the computer program product having a medium with a computer program embodied thereon, the computer program comprising:
   computer code for sending a request for a copy of system memory stored data to coherent memory configured caches of other devices, including caches of heterogeneous devices, before attempting retrieval directly from system memory;
   computer code for storing data, retrieved from a cache of a heterogeneous device, in a cache associated with the requesting device; and
   computer code for updating a state table associated with each coherent memory configured cache to reflect the appropriate state after the data is stored in the cache of the requesting device, wherein the system memory is shared by the heterogeneous devices and has a coherent memory space that includes a local store alias portion that maps a local store address space of at least one local store associated with at least one of the heterogeneous devices into a real address space of the system memory, and wherein a first heterogeneous device accesses a first local store of a second heterogeneous device using the local store alias portion of the coherent memory space in the system memory.

15. The computer program product of claim 14, wherein the first heterogeneous device is one of a control processor or a data plane processor.

16. The computer program product of claim 14, wherein the second heterogeneous device accesses a portion of data in a second local store associated with the first heterogeneous device using the local store alias portion of the coherent memory space in the system memory, and wherein the portion of data accessed in the second local store is cached in a first cache associated with the second heterogeneous device.

17. The computer program product of claim 14, wherein the first heterogeneous device accesses a portion of data in the first local store using the local store alias portion of the coherent memory space in the system memory and stores the portion of data in a second cache associated with the first heterogeneous device.

18. The computer program product of claim 14, wherein data transfers between the first local store and the shared memory are performed using the local store alias portion of the coherent memory space in the system memory.

19. A method, in a multiprocessor data processing system having a plurality of heterogeneous processors, for accessing a local store associated with a processor of the plurality of heterogeneous processors, comprising:
   mapping a local store address space of a local store associated with a second processor of the plurality of heterogeneous processors into a real address space of a system memory using a local store alias portion of a coherent memory space of the system memory; and
   accessing, by a first processor of the plurality of heterogeneous processors, the local store of the second processor using the local store alias portion of the coherent memory space in the system memory.

20. A computer program product in a computer readable medium, wherein the computer program product comprises a computer readable program which, when executed by a multiprocessor data processing system having a plurality of heterogeneous processors, causes the computing device to:
   mapping a local store address space of a local store associated with a second processor of the plurality of heterogeneous processors into a real address space of a system memory using a local store alias portion of a coherent memory space of the system memory; and
   accessing, by a first processor of the plurality of heterogeneous processors, the local store of the second processor using the local store alias portion of the coherent memory space in the system memory.

* * * * *